(12) United States Patent
Fukasaku et al.

(10) Patent No.: US 9,212,661 B2
(45) Date of Patent: Dec. 15, 2015

(54) ELECTRIC COMPRESSOR WITH THE STATOR COILS COATED WITH RESIN, THE RESIN HAVING OPENINGS EXPOSING THE COILS TO THE INTERIOR OF THE HOUSING

(75) Inventors: Hiroshi Fukasaku, Kariya (JP); Shozo Hamana, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 381 days.

(21) Appl. No.: 13/608,318

(22) Filed: Sep. 10, 2012

(65) Prior Publication Data

US 2013/0064697 A1    Mar. 14, 2013

(30) Foreign Application Priority Data

Sep. 12, 2011   (JP) ................. 2011-198075

(51) Int. Cl.
  *F04C 18/02* (2006.01)
  *H02K 3/24* (2006.01)
  *H02K 3/38* (2006.01)
  *H02K 3/44* (2006.01)
  *H02K 7/14* (2006.01)
  *H02K 9/19* (2006.01)
  *H02K 11/00* (2006.01)

(52) U.S. Cl.
  CPC .............. *F04C 18/0215* (2013.01); *H02K 3/24* (2013.01); *H02K 3/38* (2013.01); *H02K 3/44* (2013.01); *H02K 9/19* (2013.01); *F04C 2240/40* (2013.01); *H02K 7/14* (2013.01); *H02K 11/0073* (2013.01)

(58) Field of Classification Search
  CPC .......... H02K 5/08; H02K 3/505; F04C 18/16; F04C 14/26
  USPC ...................... 417/371, 410.5, 423.7; 310/201
  See application file for complete search history.

(56) References Cited

U.S. PATENT DOCUMENTS

| | | | |
|---|---|---|---|
| 2002/0073729 A1 | 6/2002 | Shibuya | |
| 2003/0046952 A1* | 3/2003 | Yasunori et al. | ................ 62/505 |
| 2004/0109771 A1* | 6/2004 | Ioi et al. | ..................... 417/410.5 |
| 2007/0052307 A1 | 3/2007 | Yoshida et al. | |
| 2007/0278869 A1* | 12/2007 | Taketsuna | ....................... 310/54 |
| 2010/0226803 A1* | 9/2010 | Tajima et al. | .............. 417/423.7 |
| 2011/0012475 A1 | 1/2011 | Mera et al. | |
| 2011/0020153 A1 | 1/2011 | Murakami | |

FOREIGN PATENT DOCUMENTS

| | | |
|---|---|---|
| CN | 101666303 A | 3/2010 |
| CN | 101958595 A | 1/2011 |

(Continued)

OTHER PUBLICATIONS

Communication dated Sep. 26, 2014 from the State Intellectual Property Office of People's Republic of China in counterpart application No. 201210328454.2.

*Primary Examiner* — Justin Jonaitis
*Assistant Examiner* — Christopher Brunjes
(74) *Attorney, Agent, or Firm* — Sughrue Mion, PLLC

(57) ABSTRACT

An electric compressor includes a housing, an electric motor, a compression mechanism, and a resin molding. The electric motor includes a coil having coil ends projecting from each of two end surfaces of the stator. Refrigerant flows through the housing that accommodates the electric motor. The resin molding covers each coil end and includes an opening that exposes part of the coil end to the interior of the housing.

11 Claims, 7 Drawing Sheets

(56) References Cited

FOREIGN PATENT DOCUMENTS

| JP | 1-130076 A | 5/1989 |
| JP | 10-271738 A | 10/1998 |
| JP | 2002-188574 A | 7/2002 |
| JP | 2002-227767 A | 8/2002 |
| JP | 2008-42956 A | 2/2008 |
| JP | 2008-184995 A | 8/2008 |
| JP | 4176231 B2 | 11/2008 |

* cited by examiner

ELECTRIC COMPRESSOR WITH THE STATOR COILS COATED WITH RESIN, THE RESIN HAVING OPENINGS EXPOSING THE COILS TO THE INTERIOR OF THE HOUSING

BACKGROUND OF THE INVENTION

The present invention relates to an electric compressor, and more particularly, to the cooling and leakage current prevention of coils wound around a stator.

An electric compressor includes a housing, a compression mechanism, which is accommodated in the housing, and an electric motor, which drives the compression mechanism. The electric compressor is installed in a vehicle and arranged in a refrigerant circuit of an air conditioner. The influence of leakage current from the electric compressor on electric devices, control devices, and the like that are installed in the vehicle should be decreased.

When an electric compressor stops operating, liquid refrigerant in the refrigerant circuit is apt to enter the housing through a suction port of the electric compressor and collect in the housing. The liquid refrigerant contains lubricant. As the amount of collected liquid refrigerant increases, coils wound around a stator of the electric motor become immersed in the liquid refrigerant. When the coils are immersed in liquid refrigerant, the permittivity of the liquid refrigerant lowers the insulation between the coils and the stator and between the coils and the housing, to which the stator is fixed. This increases the leakage current that flows to the stator and the housing. Thus, in the electric compressor, leakage current should be prevented when the electric compressor is stopped and the liquid refrigerant collects in the housing. A highly insulative lubricant (e.g., POE oil) may be used in combination with the refrigerant to suppress leakage current. However, when a substance having low insulation enters the electric compressor, leakage current cannot be suppressed even when using a highly insulative lubricant. Further, lubricant having low insulation (e.g., PAG oil) may be used depending on the specification of the electric compressor. In such a case, leakage current cannot be suppressed.

Japanese Laid-Open Patent Publication No. 2002-227767 discloses an electric compressor that suppresses leakage current. In this compressor, when voltage is applied to the electric motor, the lubricant collected on the electric motor produces leakage current. More specifically, when the dissolution rate of refrigerant in the lubricant increases, the amount of refrigerant, which has a large relative permittivity, dissolved in the refrigerant increases and thereby produces a large leakage current.

The above publication discloses two ways to suppress leakage current. One way is to form a resin molding serving as an insulator between a stator core and coils to envelop the teeth of the stator core and/or the coil ends of the coils. Another way is to form a resin molding serving as an insulator that entirely envelops the coils. In this manner, the invention of Japanese Laid-Open Patent Publication No. 2002-227767 is a resin insulator molding that improves insulation. This reduces leakage current even when refrigerant collects on the teeth and coil ends.

During the operation of the electric compressor, the coils wound around the stator are heated. This may deteriorate the coils. Further, the heat may affect a power supply unit and control unit of the electric motor that are arranged on the periphery of the electric compressor housing. Thus, in conventional, the stator and the coils of the electric motor are accommodated in the housing of the electric compressor and the refrigerant that circulates through the housing is used to cool the stator and coils of the electric motor. However, the invention of Japanese Laid-Open Patent Publication No. 2002-227767 uses a resin molding to envelop the coil ends or the entire coils and prevent contact between these parts and lubricant in which refrigerant is dissolved and thereby suppress the generation of leakage current. This insulates the coils and the housing but completely isolates the coils of the electric compressor from the circulating refrigerant. In this structure, the influence of heat from the coils cannot be prevented.

SUMMARY OF THE INVENTION

It is an object of the present invention to provide an electric compressor that suppresses leakage current in coils, which are wound around a stator, while allowing for cooling of the coils.

To achieve the above object, one aspect of the present invention is an electric compressor including a housing, an electric motor, a compression mechanism, and a resin molding. The electric motor is accommodated in an interior of the housing. The electric motor includes rotary shaft, a rotor fixed to the rotary shaft, a stator fixed to the housing, and a coil wound around the stator, the coil includes a coil end projecting from each of two end surfaces of the stator, and refrigerant flows through the interior of the housing that accommodates the electric motor. The compression mechanism is accommodated in the housing, coupled to the rotary shaft, and driven by the electric motor. The resin molding covers each coil end. The resin molding includes an opening that exposes part of the coil end to the interior of the housing.

In the above structure, the coil ends are covered by the resin molding. This suppresses a decrease in the insulation between the coil and the stator and between the coil the housing to which the stator is fixed resulting from contact between the liquid refrigerant collected in the housing and the coil end when the electric compressor stops operating. Thus leakage current can be suppressed. Further, the contact between the refrigerant circulating through the housing during operation of the electric compressor and the coil ends through the openings of the resin moldings allows for cooling of the coils.

Preferably, the electric compressor is of a horizontal type.

In a horizontal type electric compressor that is often installed in vehicles, the coil ends at the two ends of the stators are immersed in liquid refrigerant collected in the housing when the electric compressor stops operating. In the above structure, the resin moldings prevent contact between the coil ends and the liquid refrigerant and ensure suppression of leakage current, which results from a decrease in the insulation between the coil and the stator and between the coil and the housing to which the stator is fixed.

Preferably, the opening is arranged in at least an upper portion of the resin molding as viewed in a gravitational direction in a state in which the electric compressor is set.

In the above structure, lower portions of the coil ends are immersed in the liquid refrigerant collected in the housing when the electric compressor stops operating. In contrast, upper portions of the coil ends seldom come into contact with the liquid refrigerant. Thus, the leakage current suppressing function and the cooling function can be implemented in a well-balanced manner.

Preferably, the coil is one of coils for three phases that form distributed windings, and the opening is arranged at a location corresponding to part of the coil for at least one phase arranged at an upper side of the resin molding.

In the above structure, distributed winding results in coil bundles, which are wound around the stator, to come in close contact with the adjacent coil bundles. Thus, the heat conductance between the coil bundles is high. Further, by cooling part of a coil for one phase, other parts for the same coil that do not correspond to the opening of the resin molding and the coils of other phase can be sufficiently cooled.

Preferably, the distributed winding is a wave winding, and the opening is arranged at a location corresponding to part of each of the coils for the three phases.

In the above structure, wave winding results in the coils for the three phases being continuously wound to the stator. Thus, by cooling part of the coil for each phase, due to high heat conductance, coils at locations that do not correspond to the openings of the resin moldings can be sufficiently cooled.

Preferably, the coil is one of coils for a plurality of phases that form concentrated windings, and the opening is arranged at a location corresponding to part of each of the coils for the plurality of phases.

In the above structure, in concentrated winding, the coil ends of coils wound to the stator do not come into contact with each other. Thus, when the coils are used for a plurality of phases, an opening is arranged at a location corresponding to part of the coil for each phase to cool part of each phase. As a result, the high heat conductance of the coils sufficiently cools the coils arranged at locations that do not correspond to the openings of the resin molding.

Preferably, the number of the openings is the same as the number of the coil ends, and the openings are arranged at locations corresponding to the coil ends.

In the above structure, the opening arranged in each coil end cools all of the coil ends. This decreases leakage current and ensures cooling of the coils.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

Figure 1:
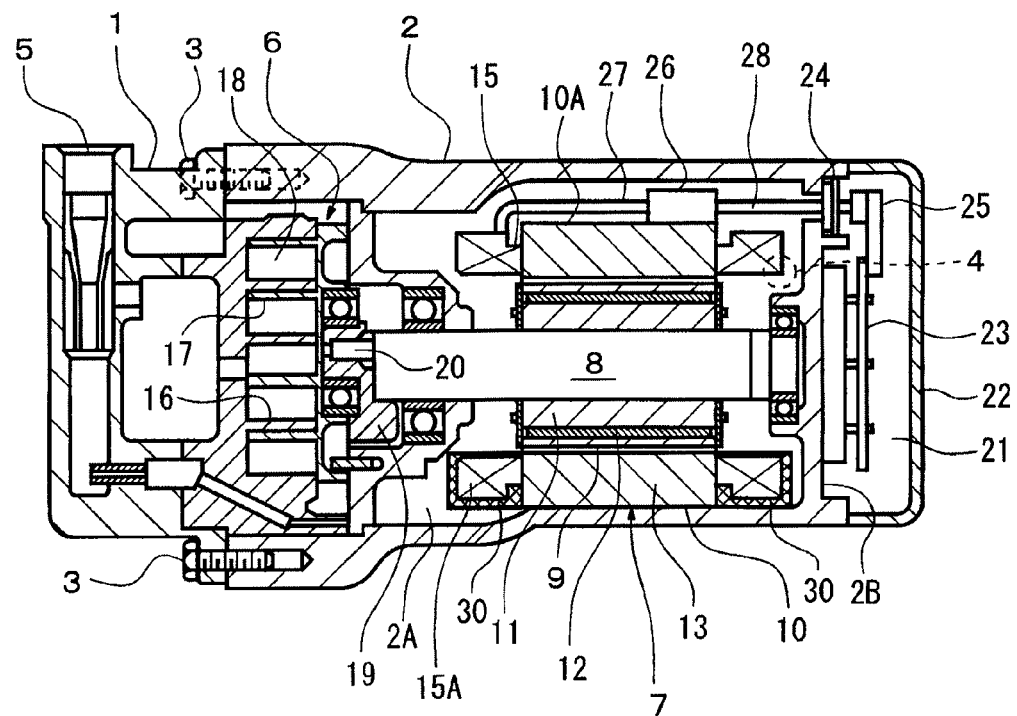
FIG. 1 is a cross-sectional view of an electric compressor according to one embodiment of the present invention.

A first embodiment of the present invention will now be described with reference to FIGS. 1 to 4. FIG. 1 shows a horizontal type scroll electric compressor, which is installed in a vehicle. A horizontal type compressor is arranged in a vehicle in a state in which its rotary shaft 8 is horizontal. When the rotary shaft 8 is arranged in a vertical state, the electric compressor is referred to as a vertical type. The electric compressor includes a closed housing. More specifically, the electric compressor includes a front housing 1 and a rear housing 2 that are fixed together by bolts 3. The housings 1 and 2 are formed from a metal material, such as aluminum or aluminum alloy. The rear housing 2 includes a suction port 4. The front housing 1 includes a discharge port 5. The suction port 4 and the discharge port 5 are connected to an external refrigerant circuit (not shown). Accordingly, refrigerant flows from the suction port 4 to the discharge port 5.

A scroll type compression mechanism 6 and an electric motor 7, which drives the compression mechanism 6, are accommodated in an interior 2A of the housings 1 and 2. The electric motor 7 includes the rotary shaft 8, which is rotatably supported by bearings on the housing 2, a rotor 9, which is fixed to the rotary shaft 8, and a stator 10, which is arranged outside of the rotor 9 and fixed to the inner wall of the housing 2. The rotor 9 includes a rotor core 11, which is formed from a laminated steel plate produced by laminating magnetic steel plates, and permanent magnets 12. The stator 10 includes a cylindrical stator core 13, which has slots 14 formed in its inner circumference, and three phases of coils 15, which are wound in the slots 14 with insulative papers (not shown) arranged in between.

The compression mechanism 6 mainly includes a fixed scroll 16, which is fixed to the inner walls of the housings 1 and 2, and the movable scroll 17, which is interleaved with the fixed scroll 16. A compression chamber 18, which is used to compress refrigerant and has a variable displacement, is formed between the fixed scroll 16 and the movable scroll 17. The movable scroll 17 is coupled by a bearing and an eccentric bushing 19 to an eccentric pin 20 of the rotary shaft 8. Thus, the movable scroll 17 orbits as the rotary shaft 8 rotates. This varies the displacement of the compression chamber 18.

The housing 2 includes a rear end surface 2B, which is joined and fixed to an inverter housing 22 that defines an inverter accommodation chamber 21. The inverter accommodation chamber 21 accommodates an inverter 23, which drives the electric motor 7, and a sealed terminal 24 that are attached to the end surface 2B of the housing 2. The sealed terminal 24 is electrically connected by a connector 25 to the inverter 23 in the inverter accommodation chamber 21. A cluster block 26 is coupled to a peripheral portion 10A of the stator 10 in the interior 2A of the housing 2. The sealed terminal 24 is electrically connected by a terminal pin 28 and the cluster block 26 to lead wires 27, which extend from the coils 15 of the stator 10.

In the electric compressor, when three-phase AC power is supplied from the inverter 23 via the sealed terminal 24 and the lead wires 27 to the coils 15 of the electric motor 7, the rotor 9 is rotated. Further, the rotary shaft 8 actuates the compression mechanism 6.

The stator 10 of the electric motor 7 will now be described in detail with reference to FIGS. 2 and 3. In correspondence with the number of poles (e.g., six poles) of the rotor 9, eighteen slots 14 are formed at equal intervals in the inner circumference of the stator core 13. Each of the coils 15 for the three phases of the U phase, V phase, and W phase are wound to the stator 10 to form a wave winding, which is one type of distributed winding. Accordingly, two coils ends 15A of each coil 15 respectively project from the two end surfaces 13A and 13B of the stator core 13. In FIG. 3, the coils ends 15A of the three phases are shown in a state spaced from one another to facilitate understanding. However, the coils ends 15A of the three phases are actually shaped to be in close contact with one another in an annular projecting state.

Two extension wires A1 and A2, B1 and B2, or C1 and C2 extend from each of the three phases of coil ends 15A, which project from one end surface 13A of the stator core 13. The extension wires A1, B1, and C1 are connected to a neutral point 29. The three extension wires A1, B1, and C1 are connected to each other and coupled to the peripheral portion 10A of the stator 10. Further, the extension wires A2, B2, and C2 are used as the lead wires 27 that connect the coils 15 to a drive circuit such as the inverter 23 and the sealed terminal 24. The ends of the lead wires 27 are attached to the cluster block 26, which is coupled to the peripheral portion 10A of the stator 10.

Figure 2:
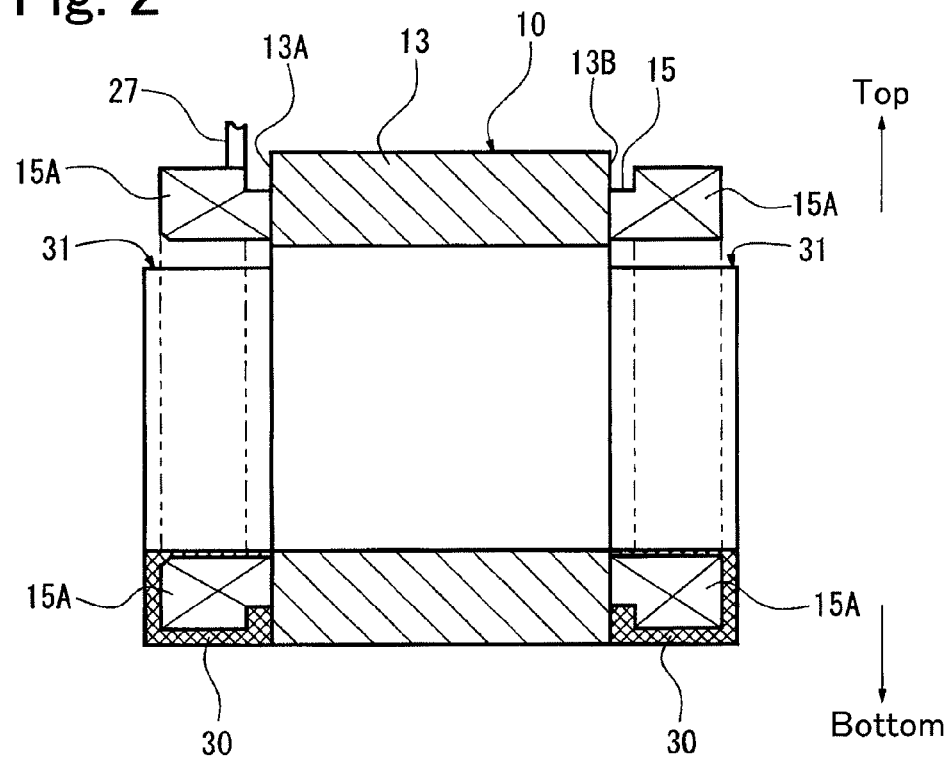
FIG. 2 is an enlarged cross-sectional view of a stator shown in FIG. 1.
Figure 3:
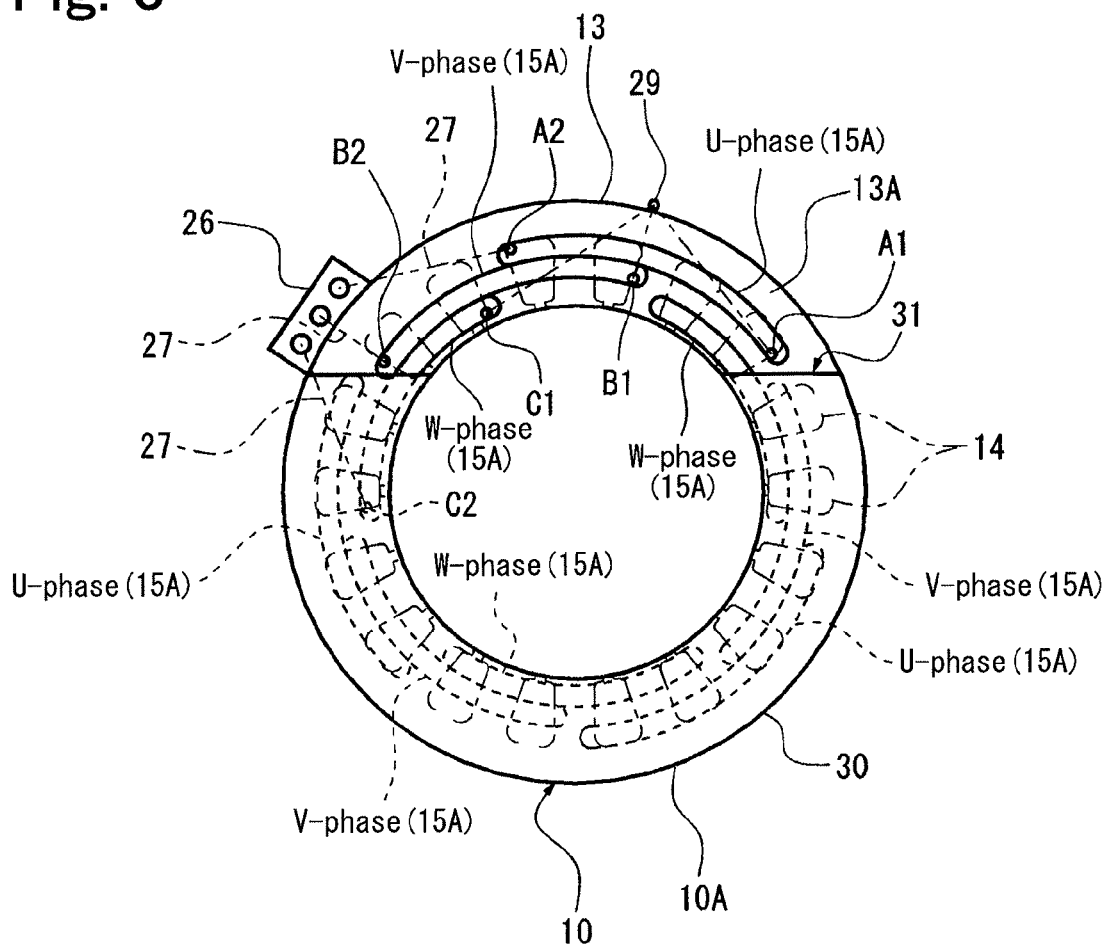
FIG. 3 is a side view of the stator shown in FIG. 1.
Figure 4:
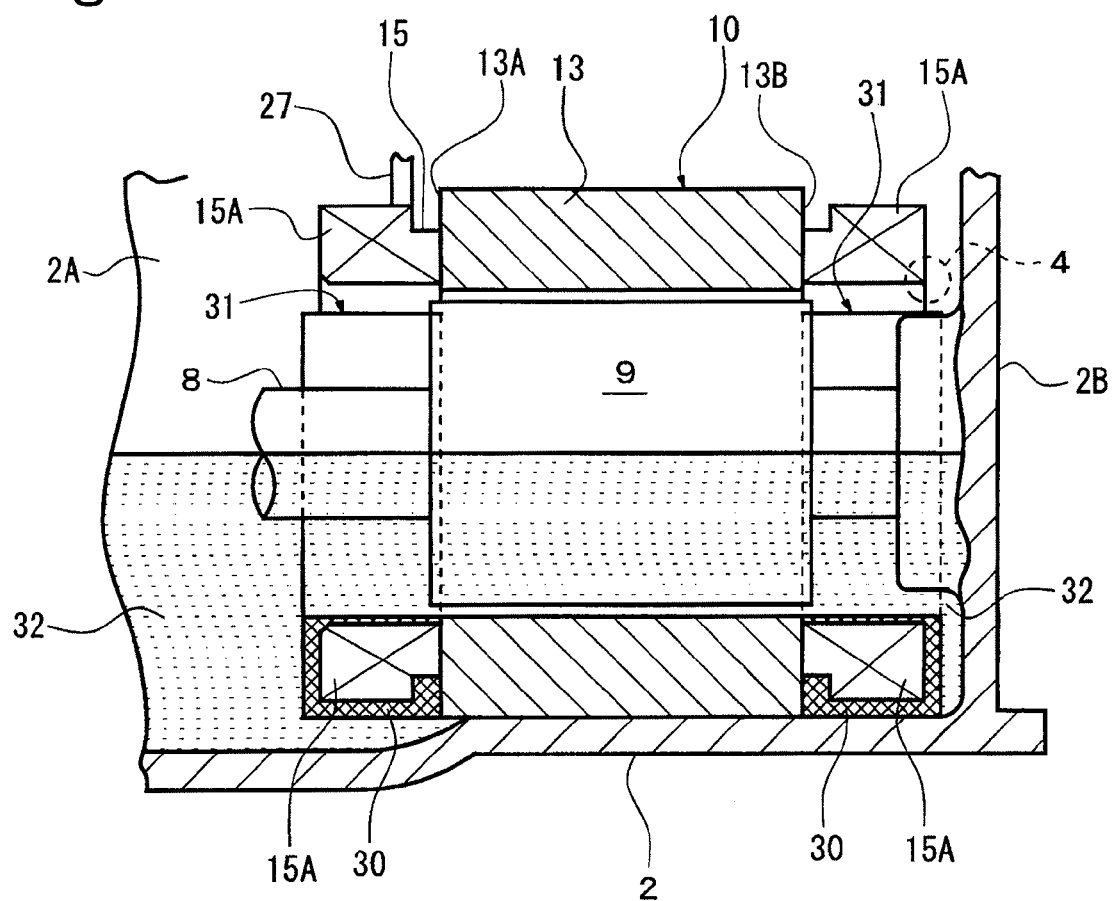
FIG. 4 is a partial cross-sectional view of an electric motor shown in FIG. 1 in a state in which liquefied coolant is collected.

Referring to FIG. 2, a resin molding 30 covers each coil end 15A projecting from the end surface 13A or end surface 13B of the stator core 13. The resin moldings 30 are formed in contact with the corresponding end surfaces 13A and 13B to seal the coil ends 15A. Further, the upper side of each resin molding 30, as viewed in the gravitational state in which the electrical compressor is set, includes an opening 31 that exposes part of the coil end 15A.

Referring to FIG. 3, the openings 31 are arranged in upper portions of the resin moldings 30 at locations corresponding to parts of each corresponding coil end 15A for the U phase, V phase, and W phase, which are located at the upper side. The openings 31 expose part of each coil end 15A to the interior 2A of the housing 2. Further, for example, like the extension wire C2, extension wires located where the coil ends 15A are covered by resin are arranged so as not to be covered by resin to form the resin molding 30 of the coil end 15A. The resin used for the resin molding 30 may be an epoxy resin, phenol resin, unsaturated polyester resin, a polyimide resin, or the like.

The first embodiment has the advantages described below.

When the electric compressor stops operating, liquid refrigerant 32, which is the residual refrigerant in the housings 1 and 2 that mixes with lubricant or the refrigerant that enters the housings 1 and 2 through the suction port 4, collects at the lower side of the interior 2A in the housings 1 and 2. The collected amount of the liquid refrigerant 32 increases as time elapses from when the electric compressor stops operating. Thus, the coil ends 15A located at the lower side of the stator 10 becomes immersed in the liquid refrigerant.

However, the coil ends 15A are mostly covered by the resin of the resin moldings 30. Thus, the coil ends 15A remain out of contact with the liquid refrigerant 32. This suppresses leakage current caused by a decrease in the insulation between the coils 15 and the stator 10 and between the coils 15 and the housing 2, to which the stator 10 is fixed. The collected amount of the liquid refrigerant 32 does not reach the upper side of the interior 2A in the housings 1 and 2. Thus, the coil ends 15A exposed to the interior 2A through the openings 31 of the resin moldings 30 do not become immersed in the liquid refrigerant 32.

When the electric compressor commences operation, the coils 15 generate heat. However, the coil ends 15A exposed through the openings 31 are exposed to and cooled by the refrigerant circulating through the housings 1 and 2 from the suction port 4 toward the compression mechanism 6. Further, each coil 15 is wound to the stator 10 in a wave winding. Thus, by exposing only part of each coil 15 to the refrigerant, the coil ends 15A covered by the resin of the resin molding 30 are cooled through heat transfer. Further, the U phase, V phase, and W phase coil ends 15A are at least partially exposed to refrigerant. This cools each of the coils ends 15A for the three phases. Accordingly, the coils 15 obtain a sufficient cooling effect in the same manner as the prior art and eliminates the influence of the heat generated by the coils 15.

Second Embodiment

Figure 5A:
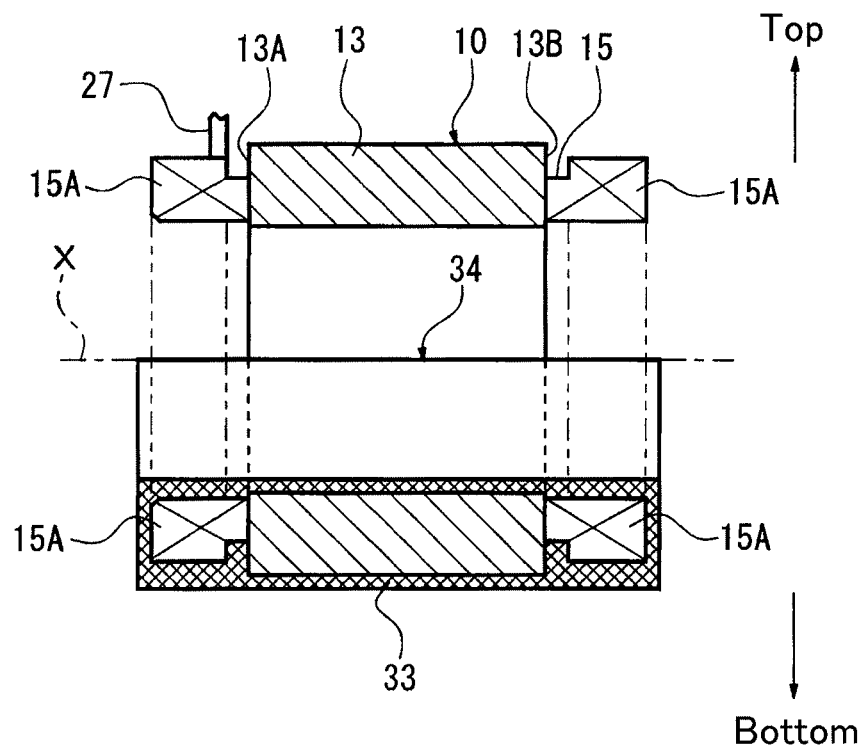
FIG. 5A is a cross-sectional view showing a stator of an electric compressor according to a second embodiment of the present invention.
Figure 5B:
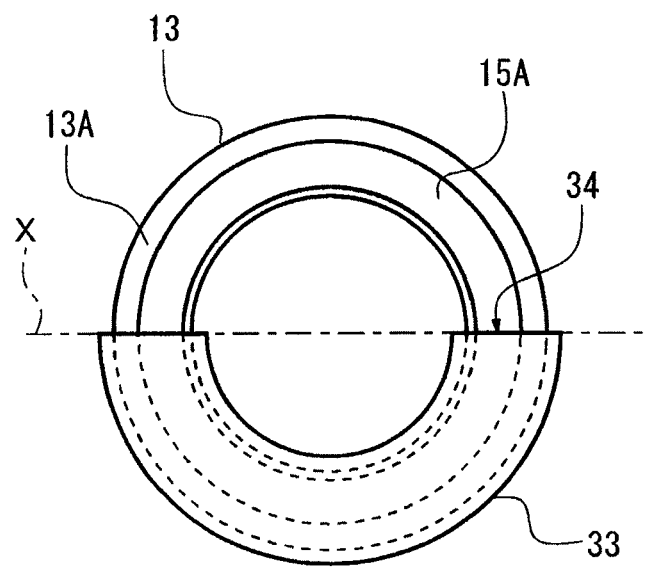
FIG. 5B is a schematic left side view showing the stator of FIG. 5A.

A second embodiment of the present invention will now be described with reference to FIGS. 5A and 5B. To avoid redundancy, like or same reference numerals are given to those components that are the same as the corresponding components of the first embodiment. Such components will not be described in detail. In the second embodiment, the stator core 13 and the coil ends 15A located downward from a horizontal plane X extending through the axis of the rotary shaft 8 are completely covered by a resin molding 33. Accordingly, an opening 34 is formed in the resin molding 33 at the upper side of the horizontal plane X, as viewed in the gravitational state in which the electrical compressor is set. The coil ends 15A of the coils 15 for the three phases located at the upper side are exposed to the interior 2A of the housings 1 and 2 through the opening 34. The stator core 13 and the stator 10, which includes the resin molding 33 arranged on the stator core 13, may be attached to the inner wall of the housing 2 by fasteners, such as screws.

In the second embodiment, even if the coil ends 15A located at the lower side are immersed in the liquid refrigerant 32 collected in the interior 2A of the housings 1 and 2 when the electric compressor stops operating, the resin molding 33 prevents the coil ends 15A at the lower side from coming into contact with the liquid refrigerant 32. The upper coil ends 15A exposed from the opening 34 of the resin molding 33 when the electric compressor is operating are sufficiently exposed to the refrigerant flowing from the suction port 4 toward the compression mechanism 6. Accordingly, the second embodiment has the same advantages as the first embodiment. Further, in the second embodiment, the resin of the resin molding 33 entirely covers the lower side of the stator 10 and the lower coil ends 15A. This entirely covers the coils 15 located at the lower side and prevents contact of the lower side of the stator 10 and the lower coils ends 15A with the liquid refrigerant 32.

Third Embodiment

Figure 6A:
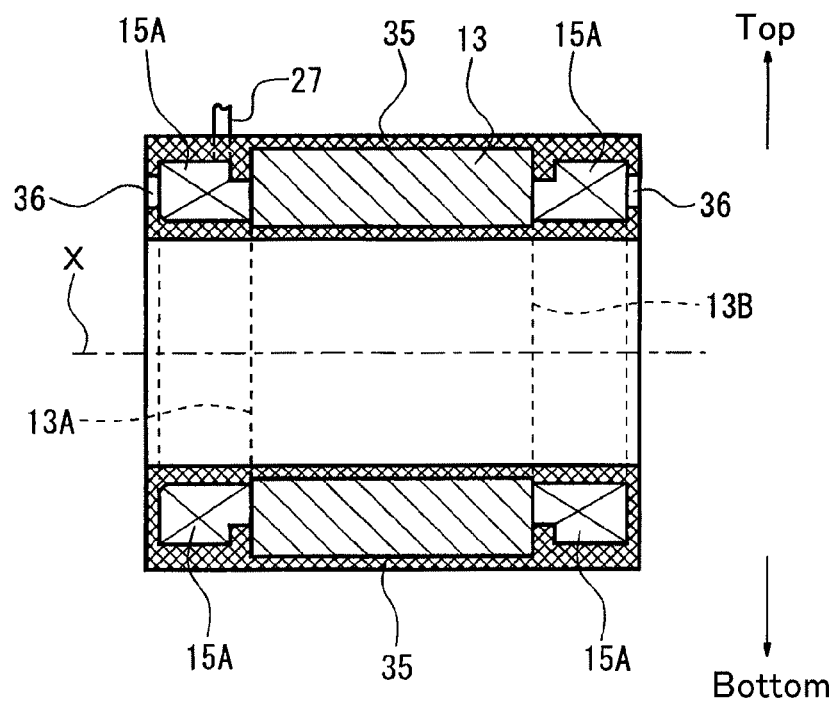
FIG. 6A is a cross-sectional view showing a stator of an electric compressor according to a third embodiment of the present invention.
Figure 6B:
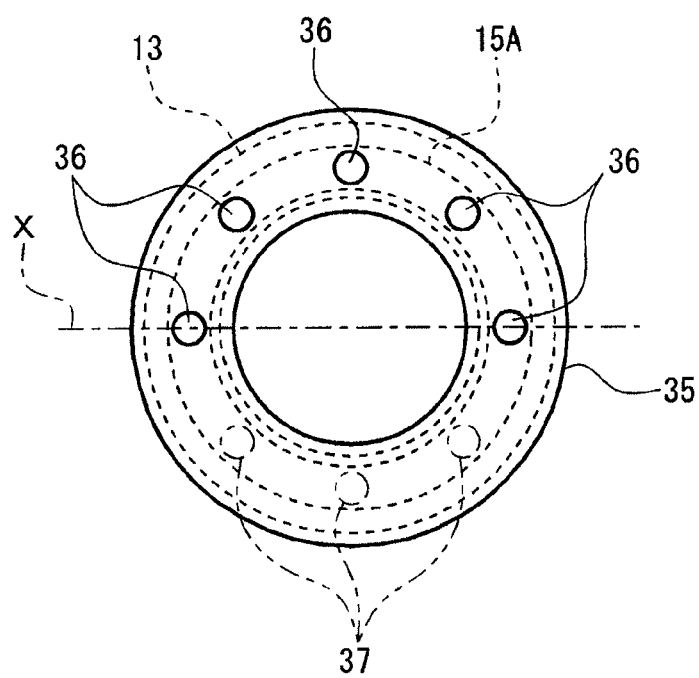
FIG. 6B is a schematic left side view showing the stator of FIG. 6A.

A third embodiment of the present invention will now be described with reference to FIGS. 6A and 6B. To avoid redundancy, like or same reference numerals are given to those components that are the same as the corresponding components of the first embodiment. Such components will not be described in detail. In the third embodiment, a resin molding 35 entirely covers the stator core 13 and the coil ends 15A. The resin molding 35 includes a plurality of circular openings 36. In the two end surfaces 13A and 13B of the stator core 13, the openings 36 are arranged at positions corresponding to the coil ends 15A located upward from the horizontal plane X that extends through the axis of the rotary shaft 8. The stator 10 including the resin molding 35 formed on the entire stator core 13 may be attached to the inner wall of the housing 2 by a fastener other than the screws described in the second embodiment, such as an adhesive agent.

In the same manner as in the second embodiment, the stator core 13 and the coil ends 15A located at the lower side of the horizontal plane X is covered by the resin of the resin molding 35 in the third embodiment. Thus, the lower side of the stator core 13 and the lower coil ends 15A do not come into contact with the collected liquid refrigerant when the electric compressor stops operating. Further, during operation of the electric compressor, the upper coil ends 15A are exposed to the interior 2A through the openings 36 of the resin molding 35 and sufficiently exposed to the refrigerant. Accordingly, the third embodiment has the same advantages as the first embodiment and the second embodiment.

In the third embodiment, the openings 36 are arranged in the portion of the resin molding 35 located upward from the horizontal plane X that extends through the axis of the rotary shaft 8. However, in addition to the upper openings 36, as shown by the hypothetical lines in FIG. 6, openings 37 may also be formed in the lower portion of the resin molding 35. In this case, some of the lower openings 37 may be immersed in the collected liquid refrigerant 32. However, the area of each coil end 15A that comes into contact with the liquid refrigerant 32 is small compared to the area of the entire coil end 15A. This effectively suppresses a decrease in the insulation between the coils and the stator and between the coils and the housing, to which the stator is fixed. Further, when the electric compressor is operating, the area of contact between the coil ends 15A and the refrigerant is larger than that of the third embodiment. This further effectively cools the coils 15.

Fourth Embodiment

Figure 7:
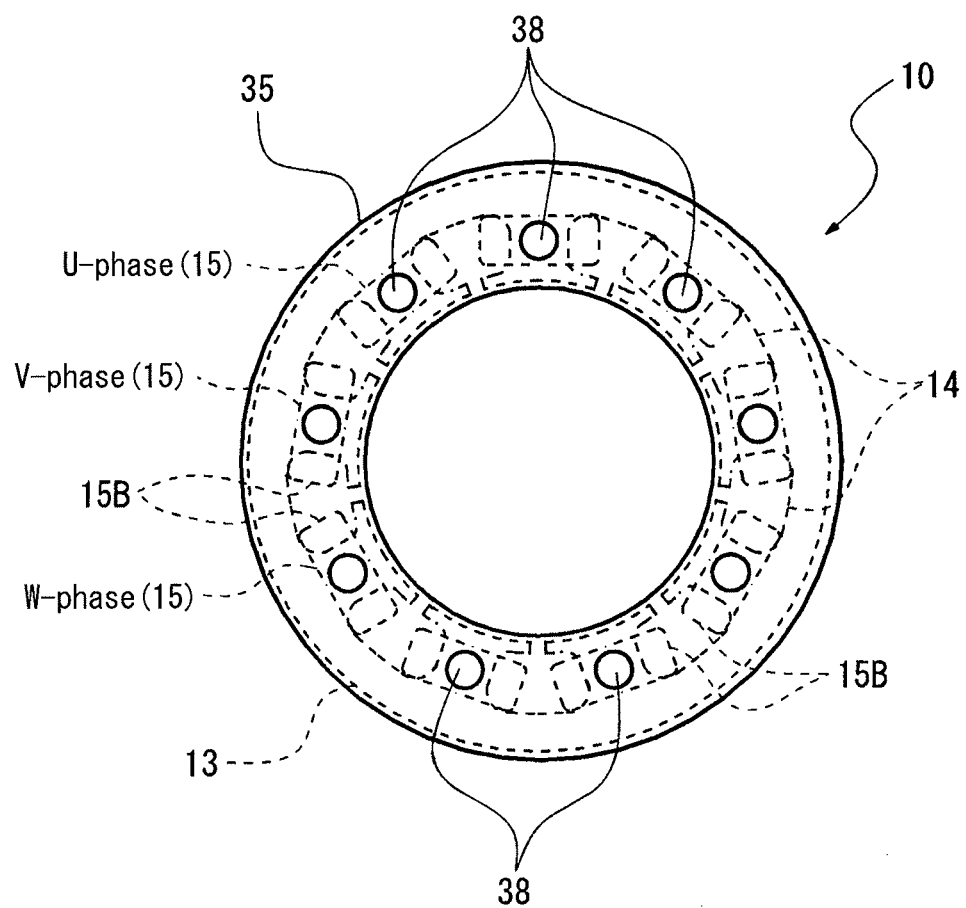
FIG. 7 is a cross-sectional view showing a stator of an electric compressor according to a fourth embodiment of the present invention.

A fourth embodiment of the present invention will now be described with reference to FIG. 7. To avoid redundancy, like or same reference numerals are given to those components that are the same as the corresponding components of the first embodiment. Such components will not be described in detail. In the fourth embodiment, the coils 15 are wound in a concentrated winding in which coil ends 15B do not contact each other. A resin molding 35 includes openings 38 formed at locations corresponding to the coils for the three phases that are in concentrated windings, that is, locations between the slots 14. In other words, the number of coil ends 15B is the same as the number of openings 38. Accordingly, leakage current is reduced, and the cooling of the coils 15 is ensured.

It should be apparent to those skilled in the art that the present invention may be embodied in many other specific forms without departing from the spirit or scope of the invention. Particularly, it should be understood that the present invention may be embodied in the following forms.

Figure 8:
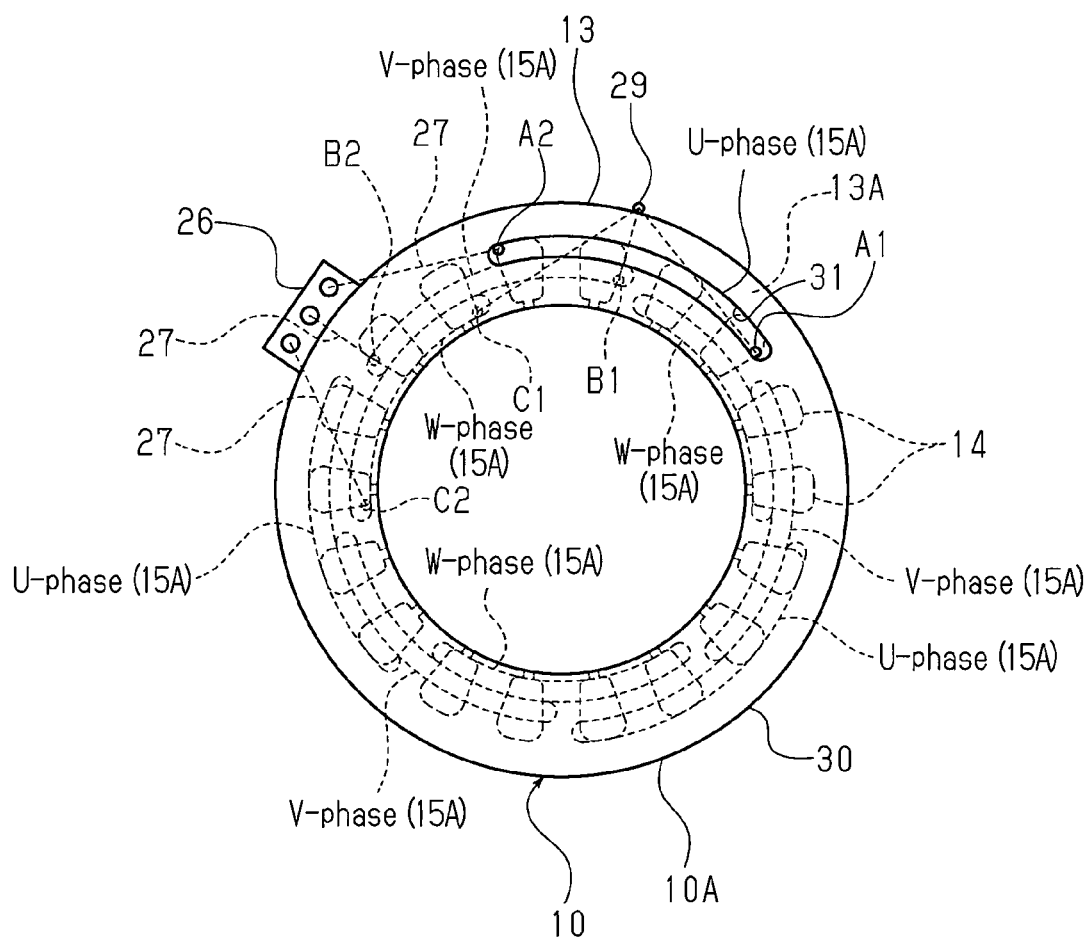
FIG. 8 is a cross-sectional view showing a stator of an electric compressor according to a further embodiment of the present invention.

(1) In the first embodiment, the opening 31 of the resin molding 30 may be arranged at locations corresponding to the coil ends 15A of the coils 15 for only one among the three phases of the U phase, the V phase, and the W phase. In this case, the coil ends 15A of the three phases may be in close contact with one another or be wound to form a wave winding. In this case, the coil end 15A for only one phase is exposed to and cooled by the coolant. However, heat transfer sufficiently cools the coils 15 for all three phases. An example of this case is shown in FIG. 8.

(2) In the second embodiment and third embodiment, the resin of each of the resin moldings 33 and 35 covers the stator core 13 and the coil ends 15A. However, like in the first embodiment, the resin of the resin moldings 33 and 35 may cover only the coil ends 15A.

(3) The winding of the coils 15 is not limited to the wave winding of the first embodiment and may be wound to form a concentric winding, which is one type of distributed winding. With concentric winding, the coils ends of the coils wound to the slots 14 of the stator core 13 will also come into close contact with each other. Thus, heat is transferred between coils in a desirable manner, and the coils are efficiently cooled in the same manner as the first to third embodiments.

(4) The inverter 23 may be arranged on the outer circumferential surface of the housing 2 instead of the end surface 2B of the housing 2. In this case, the cluster block 26 may be coupled to the peripheral portion 10A of the stator 10 or may be separated from the stator 10 and arranged freely in the interior 2A of the housing 2.

(5) The electric motor 7 of the above embodiments is an inner rotor type motor in which the stator 10 is arranged at the outer side and the rotor 9 is fitted into the stator 10. However, the present invention may also be embodied in an outer rotor type motor in which the rotor is arranged at the outer side and the stator is fitted into the rotor.

(6) In the electric motor 7 of the above embodiments, the rotor 9 includes six poles and the stator 10 includes eighteen slots. However, the number of poles and slots may be varied. For example, an electric motor may have a rotor including four poles and a stator including twelve slots.

(7) In the above embodiments, the electric motor 7 is arranged at the side of the suction port 4 under a suction refrigerant atmosphere. However, the electric motor 7 may be arranged at the side of the discharge port 5 under a discharge refrigerant atmosphere.

(8) In the above embodiments, the present invention is embodied in a scroll type electric compressor but not limited in such a manner. For example, the present invention may be embodied in other types of electric compressors incorporating an electric motor together with a rotary compressor, such as a vane type or a screw type, or a reciprocation compressor, such as a swash type or a wobble type.

(9) Each of the above embodiments may be applied to a vertical type vehicle electric compressor.

(10) In the third embodiment, the openings 36 are formed at locations corresponding to the coil ends 15A but may be formed at locations corresponding to the slots 14 and the coil ends 15A. In this case, the coils 15 of a plurality of phases are concentrated at the locations corresponding to the slots 14. This facilitates the cooling of the coils 15 for each phase and increases the cooling effect of the coils 15. In this case, the formation of the openings 36 in the two end surfaces at opposing positions in the axial direction further increases the cooling effect of the coils 15.

(11) In the fourth embodiment, the number of the openings 36 is the same as the number of the coil ends 15B. However, among the coils 15 for the three phases of the U phase, the V phase, and the W phase, the openings 36 may be arranged at locations corresponding to the coil ends 15B for the coils 15 of only one phase or at locations corresponding to parts of the coils 15 for each phase.

(12) In the above embodiments, the present invention is embodied in vehicle electric compressors. However, the application of the present invention is not limited to vehicles and may be applied to electric compressors used in houses or factories.

The present examples and embodiments are to be considered as illustrative and not restrictive, and the invention is not to be limited to the details given herein, but may be modified within the scope and equivalence of the appended claims.

The invention claimed is:

1. An electric compressor comprising:
a housing;
an electric motor accommodated in an interior of the housing, wherein the electric motor includes rotary shaft, a rotor fixed to the rotary shaft, a stator fixed to the housing, and a coil wound around the stator, the coil includes a plurality of coil ends respectively projecting from each of two end surfaces of a stator core of the stator, and refrigerant flows through the interior of the housing that accommodates the electric motor;

a compression mechanism accommodated in the housing, coupled to the rotary shaft, and driven by the electric motor; and a resin molding that covers and seals at least one of the coil ends in a lower side of the stator as viewed in a gravitational state in which the compressor is set, resin molding formed in contact with and extending from the end surfaces of the stator core, wherein the resin molding includes an opening in an upper side of the resin molding as viewed in the gravitational state so that the opening exposes others of the plurality of coil ends to the interior of the housing, wherein the compressor is configured such that when the compressor stops operating, the resin molded at least one coil ends located at the lower side of the stator becomes immersed in refrigerant and the at least one of the coil ends remains out of contract with the refrigerant, and when the electric compressor commences operation, the others of the plurality of coil ends located at the upper side of the stator that are exposed through the opening are cooled by circulating refrigerant.

2. The electric compressor according to claim 1, wherein the electric compressor is of a horizontal type.

3. The electric compressor according to claim 1, wherein the coil is one of coils for three phases that form a distributed windings, and the opening is arranged at a location corresponding to part of the coil for at least one phase arranged at an upper side of the resin molding.

4. The electric compressor according to claim 3, wherein the distributed winding is a wave winding, and the opening is arranged at a location corresponding to part of each of the coils for the three phases.

5. The electric compressor according to claim 1, wherein the coil is one of coils for a plurality of phases that form concentrated windings, and the opening is arranged at a location corresponding to part of each of the coils for the plurality of phases.

6. The electric compressor according to claim 5, wherein the number of the openings is the same as the number of the coil ends, and the openings are arranged at locations corresponding to the coil ends.

7. The electric compressor according to claim 1, wherein a plurality of extension wires extending from the coil ends are not covered by the resin molding.

8. The electric compressor according to claim 1, wherein the opening of the resin molding is arranged at allocation corresponding to the coil ends of the coils for only one of three phases of the stator.

9. The electric compressor according to claim 1, wherein only part of the coil is exposed to the refrigerant during operation of the compressor such that the coil ends covered by resin are cooled through heat transfer when immersed in refrigerant.

10. The electric compressor according to claim 1, wherein the opening is configured in a circular shape.

11. An electric compressor comprising:

a housing;

an electric motor accommodated in an interior of the housing, wherein the electric motor includes a rotary shaft, a rotor fixed to the rotary shaft, a stator fixed to the housing and a coil wound around the stator, the coil includes a plurality of coil ends respectively projecting from each of two end surfaces of a stator core of the stator, and refrigerant flows through the interior of the housing that accommodates the electric motor;

a compression mechanism accommodated in the housing, coupled to the rotary shaft, and driven by the electric motor; and a resin molding that covers and seals the coil ends, the resin molding formed in contact with and extending from the end surfaces of the stator core, wherein the resin molding includes a through-hole in an upper side of the resin molding as viewed in a gravitational state in which the compressor is set, the through-hole exposing at least one of the coil ends in an upper side of the stator as viewed in the gravitational state to the interior of the housing, wherein the compressor is configured such that when the compressor stops operating, the resin molded coil ends located at a lower side of the stator become immersed in refrigerant and the coil ends remain out of contact with the refrigerant, and when the electric compressor commences operation, the at least one of the coil ends located at the upper side of the stator that are exposed through the through-hole are cooled by circulating refrigerant.

* * * * *